March 27, 1973     L. A. CASPER     3,723,212
HEAT SEALING APPARATUS AND METHOD
Filed April 26, 1971
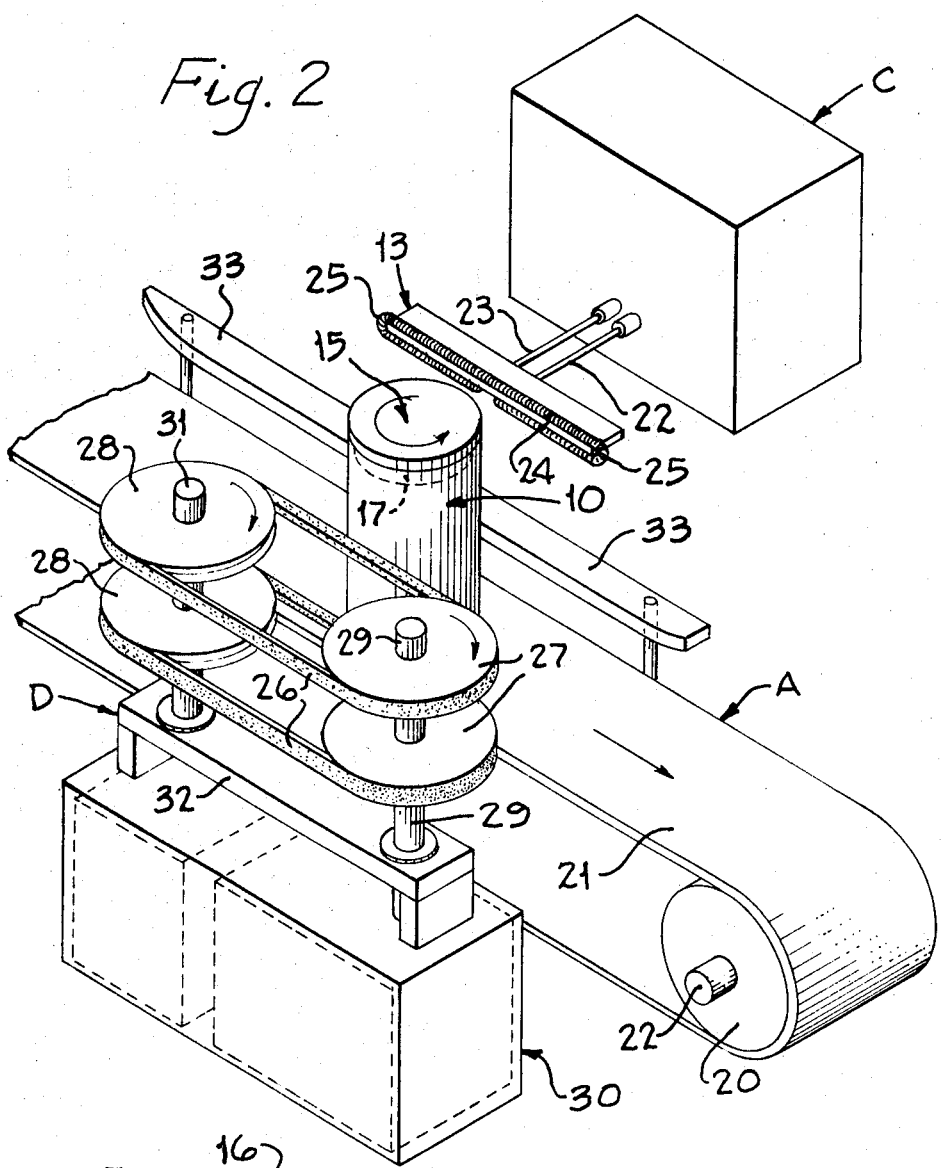
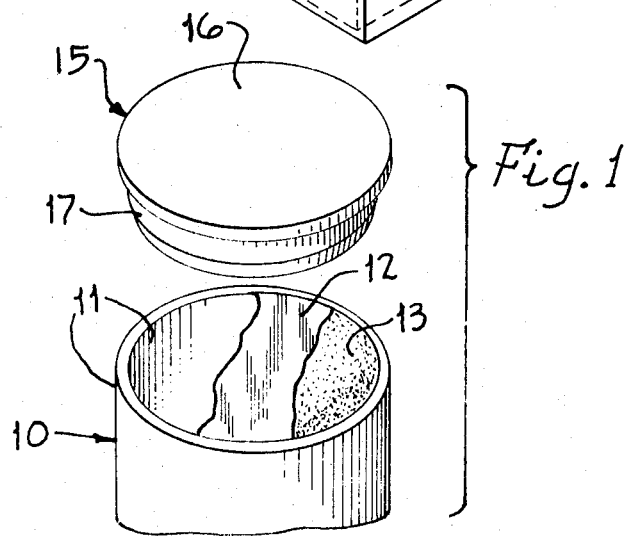
INVENTOR
LEE A. CASPER
BY Barry Moyerman.
ATTORNEY

United States Patent Office

3,723,212
Patented Mar. 27, 1973

3,723,212
HEAT SEALING APPARATUS AND METHOD
Lee A. Casper, Merion, Pa., assignor to Iron
Mountain, Inc., Wilmington, Del.
Filed Apr. 26, 1971, Ser. No. 137,434
Int. Cl. B29c 27/04
U.S. Cl. 156—69  8 Claims

ABSTRACT OF THE DISCLOSURE

Radio frequency energy is utilized to adhesively secure a plug closure in an end of a laminated cylindrical container having a metallic foil lamina and an interior coated with a thermoplastic adhesive. The closure is inserted and frictionally retained in an end of the container, following which it is adhesively and permanently secured. This is done by conveying it through a heat sealing station wherein it is rotated and subjected to moving tangential contact with a beam of radio frequency energy. The metallic foil lamina, acting as an inductive susceptor, causes selective and sequential sealing of closure and container, as the container is rotated.

BACKGROUND OF THE INVENTION

(1) Field of the invention

This invention relates to the closing of laminated tubular containers. More particularly, it relates to a method and apparatus for the permanent closing of the end of a cylindrical container with a plug closure which is heat sealed therein.

(2) Prior art

Laminated cylindrical containers find many uses, particularly as packages for cleanser, spices, chemicals and the like. Their shape makes them adapted for economical and convenient storage. In conjunction with closures which incorporate spouts or other dispensing arrangements, they can be kept at the point of use for the period of time necessary to use up their contents.

Typical prior art patents which show cylindrical dispensing containers including plug type closures are U.S. Pat. Nos. 2,961,132 and 2,961,133.

In general, great resiliance has been placed upon frictional engagement of such plug closures within the cylindrical container. Certainly such retention is inexpensive. However, it is not necessarily a positive type of retention and places an often unwarranted reliance on the uniformity of tube diameter and the dimensional tolerances with which plug closures are made. Often such closures work loose in transit, or in use, causing the contents of the container to be lost.

It would therefore be desirable to permanently seal such closures to the cylindrical containers. Application of glue for this purpose involves relatively complex machinery and has a concomitant risk of contaminating the contents, particularly where the closure is a top closure on a container filled with delicate spices. Use of a thermoplastic adhesive, where heat is applied grossly and indiscriminately (as with a blast of hot air or a heated anvil) also risks damaging the contents or the container or both.

SUMMARY OF THE INVENTION

A generally cylindrical laminated container having a metallic foil lamina is closed, utilizing a plug closure which fits into an end thereof. As used herein, the term plug closure refers to either a top or bottom closure and a given container may have such plug closures both top and bottom. The closure is inserted in the open end of the container and frictionally retained therein. When dealing with filled containers, the top closure is most often of a dispensing type.

The particular improvement involved, in terms of method, relates to heat sealing of the closure to the container utilizing radio frequency energy. The container is provided with an internal coating of conventional thermoplastic adhesive which is of a formulation compatible with the material of which the plug closure is fabricated. In a heat sealing zone, the container is subjected to highly focused radio frequency energy and is rotated so that there is moving tangential contact between the perimeter of the container and the area of concentrated radio frequency energy. The metallic lamina in the radio frequency contact area acts as an inductive susceptor and heats, to cause the thermoplastic adhesive to soften and sealing to be effected. This is done without any effect on the contents of the container and without any noticeable change in external temperature, even in the small zone where sealing is occurring at a given moment of time. One revolution of the container about its longitudinal axis is all that is necessary to effect complete perimetrical sealing.

The improvement, in terms of apparatus, comprises a conveyor which carries the container, preferably in an upright position, past a radio frequency radiating antenna. Means are provided for rotating the conveyor around its longitudinal axis, for at least one revolution while it is passing the antenna. The antenna is preferably linear, and may extend for a distance of at least pi times the container diameter. The field it radiates is confined to a highly focused linear path with which the container's perimeter makes a moving or rolling contact as it passes through the apparatus. Means are provided for rotating the conveyor drive and a conventional radio frequency generator is linked or coupled to the antenna.

Accordingly, it is an object of the invention to provide a method for adhesively heat sealing a plug closure into the end of a cylindrical container using radio frequency energy to create temporary and highly localized inductive heating by co-action of the energy field and a metallic foil layer in the container which acts as an inductive susceptor.

It is also an object of the invention to provide radio frequency inductive heat sealing apparatus which includes means for rotating a laminated cylindrical container as it passes through a field of radio frequency energy with which it makes moving peripheral contact.

Still another object of the invention is to provide both a method and apparatus for heat sealing plug closures in the ends of cylindrical containers without subjecting their contents to any significant quantity of heat.

These and other objects of the invention will be apparent to those skilled in the art from consideration of the detailed description which follows.

BRIEF DESCRIPTION OF THE DRAWING

In the drawing, wherein like reference numerals designate like parts:

FIG. 1 represents a fragmentary exploded isometric view of a container and plug closure in connection with which the invention may be utilized.

FIG. 2 represents a fragmentary isometric view of an apparatus embodying the invention, partially in diagrammatic form.

DESCRIPTION OF A PREFERRED EMBODIMENT

FIG. 1 shows a laminated cylindrical container 10, having a paper lamina 11, a metallic foil lamina (such as, for example, aluminum foil) 12 and an interior adhesive coating 13. Coating 13 may be confined to the ends of the container. While a single lamina 11 has been shown, there may be a plurality of such lamina. Further, the foil layer need not be the interiormost layer, although such positioning has obvious advantages where the contents can benfit from direct contact with this type of material. Any metal can be used which will act as a susceptor for radio frequency energy, but aluminum works surprisingly well and is most preferred. Standard thermoplastic adhesive formulations are utilized such as, for example, wax and polyethylene mixtures, vinyl copolymers and the like.

A plug closure, generally 15, adapted to be inserted and frictionally retained within container 10 is provided which includes a disc top 16 and an integral dependent sleeve 17. When seated, prior to sealing, the underside of disc 16 abuts the edge of container 10 and the sleeve 17 is frictionally engaged. A wide variety of top and bottom closures may be used with the invention. Top closures are preferably of the dispensing variety such as that shown in FIG. 2 of U.S. Pat. No. 2,961,132. Such closures may be made of any suitable material such as styrene, polyethylene, etc.

Apparatus for practicing the invention is shown in FIG. 2. The apparatus includes a heat sealing station comprising a conveyor A, a radio frequency radiating antenna B, a radio frequency generator C and means, D, for rotating the container 10 as it passes through the station.

Conveyor A is a conventional horizontal type adapted to move the container 10 through the station in an upright position. It includes a drive pulley 20 and a moving belt 21 on which the container is supported. Drive means (not shown) rotate the pulley shaft 22 at a fixed or variable speed, depending on whether a fixed or variable speed motor is employed. The radio frequency generator C is also of a conventional type, used for induction heating. Such a unit is fully described in Bulletin E 101 published by Lepel High Frequency Laboratories, Inc. Such a unit, rated at 2.5 kw. power output (in accordance with NEMA standards) can be operated either in the range of 250 to 450 kc. or 2.5 to 30 mc., depending upon the particular metallic foil being used and the materials of construction of the closure. The generator C is linked to antenna B, which radiates the radio frequency energy in a focused linear path.

A preferred form of antenna, as shown in FIG. 2, comprises leads 23 which connect to the ends of a flattened loop 24, having hairpin end portions 25, which extends longitudinally parallel to the path of travel of the conveyor. The height of antenna B is preferably adjusted so that it is within the vertical confines of closure 15 (i.e. proximate sleeve 17). Energy radiated from the antenna makes perimetrical tangential contact with container 10. For reasons which will be apparent as the discussion proceds, it is preferred that the antenna extend longitudinally a distance which is at least pi times the diameter of the container.

Various rotating means D are within the scope of the invention including a turntable construction. However, preferred means are shown in FIG. 2. These include a plurality of belts 26 which are mounted between drive pulleys 27 and idler pulleys 28. The drive pulleys are mounted on shaft 29, which is powered by a variable speed motor unit, diagrammatically represented as 30. Shaft 29 and idler shaft 31 are both journaled through a bracket 32, which is mounted on unit 30. Rotation of the pulleys is in the direction indicated by the arcuate arrows. Across belt 21, opposite belts 26, is a guide bar 33, which is positioned at a height to contact container 10 intermediate its ends. The distance between the inner edge of guide bar 32 and belts 26 is such that both simultaneously contact diametrically opposed perimetrical portions of container 10. The conveyor moves in the direction shown by the arrow on belt 21. With the speed of shaft 29 properly adjusted, the belts 26 cause container 10 to rotate, as shown by the circular arrow in the drawing, and the belts' speed is adjusted so that the container makes at least one revolution while it is within the linear confines of antenna B. An empirical relationship found satisfactory is to have belt 26 moving at about three times the linear speed of belt 21.

The number of belts 26 may be varied depending on the height of container 10. Also, in lieu of the guide bar 33, one may employ another set of belts and pulleys moving in a direction opposite to the direction of travel of belts 26. Such variants are intended to be included within the meaning of rotating means as used herein.

The shape of the antenna provides a focused shallow beam of radio frequency energy which is confined to a linear path so that, as the container rotates, it makes moving tangential contact with it. As sequential portions of the rotating container contact the field, the metallic foil acts as a susceptor and provides enough instantaneous heat to cause the thermoplastic adhesive to soften. Cooling and sealing occur instantly, as soon as the particular container portion passes out of the field. The total effect is to provide selective sequential heating, which does not raise the total temperature of the container, let alone have any temperature effect on its contents.

While a preferred embodiment of the invention has been described in detail, it should be understood that many changes and modifications, particularly in minor details of construction, are possible. Consequently, the true spirit and scope of the invention is to be determined only by reference to the appended claims.

I claim:

1. In the method of permanently closing an end of a laminated cylindrical container, having a metallic foil lamina in the walls thereof and an interior coated with a thermoplastic adhesive, utilizing a plug closure made of material which is sealingly compatible with said adhesive, said plug being inserted into said end and frictionally retained therein, the improvement which comprises:

moving said container in a horizontal plane through a heat sealing station;

rotating said container about its longitudinal axis for at least one revolution, while it is passing through said station;

rotating said container about its longitudinal axis for at least one revolution, while it is passing through said station;

subjecting said container to radio frequency energy beamed in a fixed linear path, said container making moving tangential contact with said path at an elevation within the longitudinal confines of said plug, whereby said foil lamina acts as an inductive susceptor and the plug closure is permanently heat sealed to the end of the container, as the container moves through the station, without raising the exterior temperature of the container or the temperature of any contents thereof.

2. The method of calim 1 wherein the longitudinal axis of said container is perpendicular to said horizontal plane.

3. The method of claim 2 wherein the rotation of said container is achieved by application of a tangential rotational force to the wall of the cylinder while, simultaneously, transverse displacement thereof is prevented.

4. Apparatus for heat sealing of a plug closure which is frictionally retained in the end of a laminated cylindrical container having a metallic foil lamina and an interior coated with a thermoplastic adhesive, which is sealingly compatible with said plug closure, comprising:

a horizontal conveyor adapted to move the container along a linear path;

a longitudinally extending radio frequency antenna proximate one edge of said conveyor, said antenna being located parallel to the path of said conveyor and at an elevation within the longitudinal confines of the plug;

a radio frequency generator linked to said antenna; and means for rotating the container about its longitudinal axis for at least one revolution as it is carried past said antenna by said conveyor;

whereby said container is subjected to moving tangential contact with the radio frequency energy radiated from said antenna and the metallic foil lamina, acting as an inductive susceptor, causes selective heating of said adhesive to effect a permanent seal between the closure and the container.

5. The apparatus of claim 4 wherein the length of said antenna is at least pi times the diameter of the container.

6. The apparatus of claim 5 wherein said means for rotating the container includes a horizontal, longitudinally extending moving belt in continuous tangential contact with the container, as it is carried past said antenna, which belt imparts rotational motion to said container.

7. The apparatus of claim 6 which further includes a longitudinally extending guide bar proximate the conveyor, in spaced apart parallel relationship to said longitudinally extending belt, the distance between the belt and the guide bar being essentially the diameter of the container and both contacting diametrically opposed portions of a container passing between them.

8. The apparatus of claim 6 which utilized a plurality of belts spaced apart over the length of container, each of which is in contact with aligned perimetrical portions of the container.

References Cited

UNITED STATES PATENTS

| | | | |
|---|---|---|---|
| 2,620,939 | 12/1952 | Weisgerber | 156—273 X |
| 3,475,243 | 10/1969 | Scalora | 156—380 X |
| 3,281,302 | 10/1966 | Kreh et al. | 156—380 X |
| 2,889,078 | 6/1959 | Thomas | 156—69 X |

EDWARD G. WHITBY, Primary Examiner

U.S. Cl. X.R.

156—272, 273, 380; 219—10.57